United States Patent
Woods et al.

(10) Patent No.: US 8,168,067 B2
(45) Date of Patent: May 1, 2012

(54) PROCESS FOR INCORPORATING A DRY TREATMENT PRODUCT INTO A LIQUID WASTE

(75) Inventors: Roger H. Woods, Watford (CA); Doug Pullman, Watford (CA)

(73) Assignee: Metaflo Technologies Inc., Walford, Ontario (CA)

( * ) Notice: Subject to any disclaimer, the term of this patent is extended or adjusted under 35 U.S.C. 154(b) by 0 days.

(21) Appl. No.: 13/017,649

(22) Filed: Jan. 31, 2011

(65) Prior Publication Data
US 2011/0124944 A1 May 26, 2011

Related U.S. Application Data

(62) Division of application No. 11/994,384, filed as application No. PCT/CA2006/001099 on Dec. 31, 2007, now Pat. No. 7,901,571.

(60) Provisional application No. 60/695,887, filed on Jul. 5, 2005.

(51) Int. Cl.
*C02F 11/14* (2006.01)
(52) U.S. Cl. ........ 210/662; 210/666; 210/689; 210/709; 210/712; 210/714; 210/728; 210/738; 588/255
(58) Field of Classification Search ................... 210/710
See application file for complete search history.

(56) References Cited

U.S. PATENT DOCUMENTS

| | | | | | |
|---|---|---|---|---|---|
| 4,149,968 | A | * | 4/1979 | Kupiec et al. | 210/665 |
| 4,194,998 | A | * | 3/1980 | Fanta et al. | 527/314 |
| 4,451,377 | A | * | 5/1984 | Luxemburg | 210/708 |
| 4,842,773 | A | | 6/1989 | Kunz et al. | |
| 4,913,585 | A | * | 4/1990 | Thompson et al. | 405/129.25 |
| RE34,041 | E | * | 8/1992 | Doan | 252/628 |
| 5,258,123 | A | * | 11/1993 | Huang et al. | 210/663 |
| 7,670,277 | B2 | * | 3/2010 | Ross et al. | 588/256 |
| 7,901,571 | B2 | * | 3/2011 | Woods et al. | 210/96.1 |

FOREIGN PATENT DOCUMENTS

JP 59-32898 A 2/1984

* cited by examiner

*Primary Examiner* — Peter A Hruskoci
(74) *Attorney, Agent, or Firm* — Shoemaker and Mattare

(57) ABSTRACT

A process for treating and disposing a liquid waste, which is solidified prior to disposal, includes steps of adding to said liquid waste a dry treatment product generally comprising approximately 25% to 75% bentonite clay and respectively 75% to 25% of a liquid-sorbing polymer, subjecting the liquid waste to a single pass high shear mix so as to incorporate the treatment product into the liquid waste with increased dispersion and reduced agglomeration, subjecting the treated liquid waste to a retention time suitable for solidification, and disposing of the solidified liquid waste. The liquid waste preferably is recirculated prior to addition of dry treatment product so as to permit a calibration of the characteristics of the liquid waste, and subsequent determination of the correct rate of dry treatment addition.

3 Claims, 4 Drawing Sheets

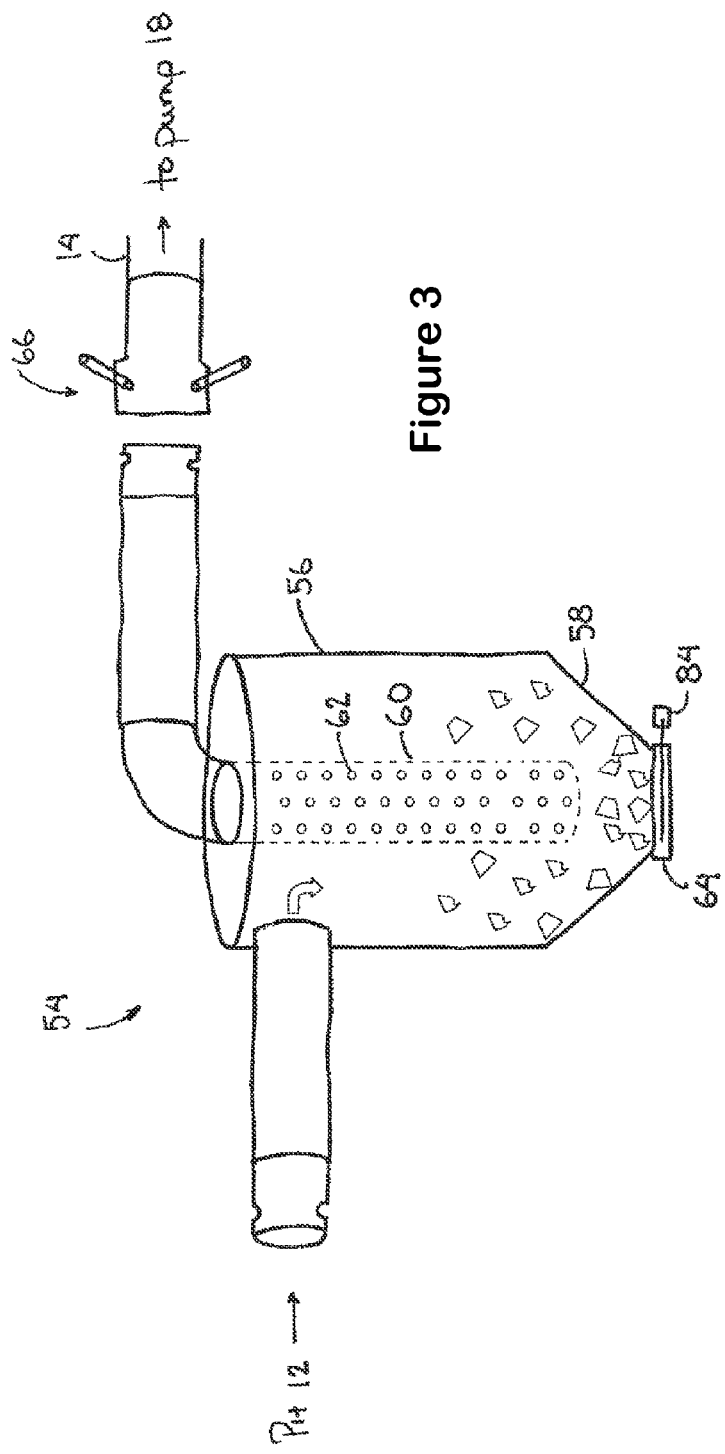
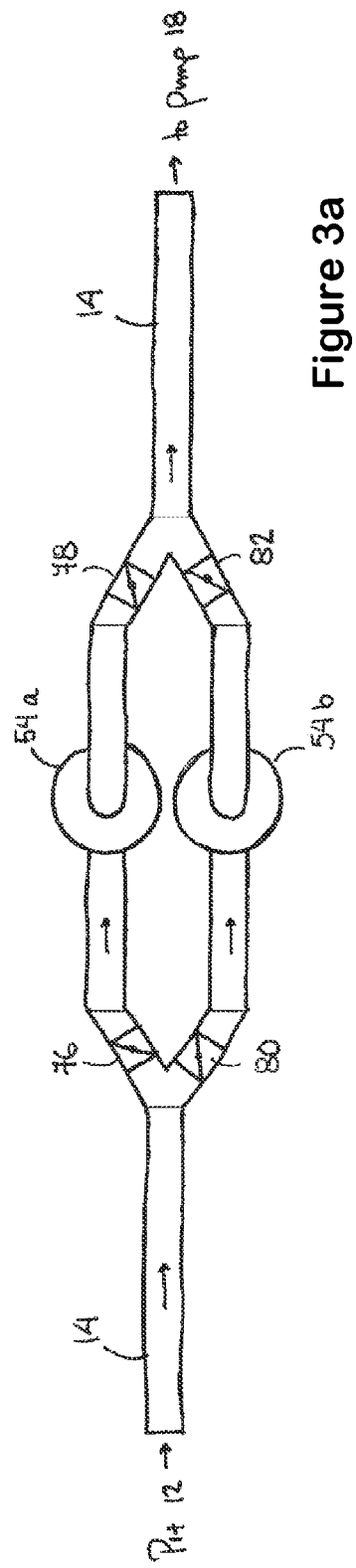

PROCESS FOR INCORPORATING A DRY TREATMENT PRODUCT INTO A LIQUID WASTE

This application is a division of copending application Ser. No. 11/994,384 filed Dec. 31, 2007 as the U.S. national stage of international application PCT/CA2006/01099, filed Jul. 5, 2006, which claims benefit of U.S. provisional application 60/695887, filed Jul. 5, 2005.

FIELD OF THE INVENTION

The present invention relates to a method for treating liquid waste material. In particular, the present invention relates to a flow-through mixing process for incorporating a dry treatment product into a waste stream

BACKGROUND OF THE INVENTION

A wide variety of industries produce liquid waste and consequently, are in a constant search for economical means for disposal. While disposal to local waste treatment/disposal facilities is one option available, the costs associated with this means are often excessive.

Solid waste disposal is a less expensive means of waste disposal. As such, conversion of liquid waste into a "dry" or "solid" form is desirable, but not easily attained. A variety of treatment products have been used including sawdust, lime/Portland cement, zeolites and clays. Unfortunately, these products generally result in excessive bulk up, resulting in considerable transportation costs. For example, it is not uncommon with the prior art technologies to experience a bulk-up of anywhere from 40%-300%. A further issue with prior art technologies is that leaching of the liquid waste from the treated product can occur, thus presenting further environmental issues during both transport and solids disposal.

In many instances, the excessive bulk-up experienced, and the poor retention of the liquid waste by the treatment product is due to a poor incorporation of the treatment product into the waste stream. In many instances, the waste is generated at locations where transportation of liquid waste off-site is very difficult. For example, in drilling operations, treatment of the resulting liquid waste, that is the liquid containing the drilling slurry as well as any contaminants (i.e. debris, hydrocarbons, etc.) requires a step-wise approach that is spread over a lengthy period of time. For example, in regions difficult to access (i.e. northern areas), equipment is first transported to a drilling site during winter months and drilling operations commence. The following summer, the resulting liquid waste that was accumulated during the winter drilling season is batch treated with prior art technologies (i.e. sawdust). If removal from the site is necessary, (i.e. with hydrocarbon contaminated waste), the treated liquid waste is transported out of the site the following winter. This treatment regimen is lengthy, very expensive and subject to environmental scrutiny.

There is clearly a need for an improved treatment process that is able to effectively and efficiently process liquid waste into a "dry" or "solid" product that is suitable for solids disposal. There is further a clear requirement for an apparatus and process that permits the efficient incorporation of a dry treatment product into a waste stream, so as to reduce the bulk-up experienced with prior art technologies.

SUMMARY OF THE INVENTION

Broadly stated, the present invention provides an apparatus and process for converting liquid waste material originating from a variety of industries (i.e. horizontal directional drilling, oil drilling operations, etc.) into solid waste allowing for disposal as a solid product, thereby reducing disposal costs and potential environmental issues related to transport and disposal of liquid waste.

According to an aspect, there is provided a single-pass flow-through mixing apparatus for incorporating a dry treatment product into a waste stream, said apparatus comprising:

a pump for directing a liquid waste from a storage pit/tank;

a mixer receiving said liquid waste from said pump, said mixer comprising a jet nozzle, a venturi tube and a high-shear assembly;

a valve downstream of said mixer for either recirculating said liquid waste back to said storage pit/tank via a recirculation conduit, or directing said liquid waste to a discharge conduit;

wherein said recirculation conduit defines a calibration loop for determining the appropriate treatment regimens based on the characteristics of the waste liquid;

said recirculation conduit also permitting homogenization of said pit/tank contents prior to addition of said dry treatment product; and wherein dry treatment product introduced at the mixer is subjected to high shear forces, thereby incorporating the dry treatment product into the waste stream with increased dispersion and reduced agglomeration.

According to another aspect, there is provided a process for treating and disposing of a liquid waste wherein said liquid waste is solidified prior to waste disposal, said process comprising:

adding to said liquid waste a dry treatment product generally comprising approximately 25% to 75% bentonite clay and respectively 75% to 25% of a liquid-sorbing polymer, subjecting said liquid waste to a single pass high shear mix so as to incorporate said treatment product into said liquid waste with increased dispersion and reduced agglomeration;

subjecting the treated liquid waste to a retention time suitable for solidification; and disposing of the solidified liquid waste.

According to a further aspect, there is provided a process for solidifying a liquid waste prior to waste disposal, said process comprising:

adding to said liquid waste a treatment product generally comprising bentonite clay and a liquid-sorbing polymer, subjecting said liquid waste to high shear forces so as to incorporate said treatment product into said liquid waste with increased dispersion and reduced agglomeration; subjecting the treated liquid waste to a retention time suitable for solidification;

storing said treated liquid waste to allow for evaporation of water, thereby resulting in a decrease in overall volume relative to a predetermined initial volume of liquid waste to be treated.

BRIEF DESCRIPTION OF THE FIGURES

FIG. 3 is a perspective view of a prefilter suitable for use with the apparatus shown in either of FIG. 1 or 2.

FIG. 3a is a schematic diagram of a plurality of prefilters as shown in FIG. 3, the prefilters being shown in parallel.

DESCRIPTION OF THE EMBODIMENTS

In the following description, embodiments of an apparatus and process for treating liquid waste material are described. In general, the process includes the treatment of liquid waste, for example liquid waste originating from horizontal directional drilling (HDD) or oil drilling operations wherein this waste is "solidified" by way of chemical treatment. More specifically, the process includes 4 basic operations: 1) liquid waste material delivery, 2) chemical/physical treatment to promote sorption of liquid and conversion of the liquid waste into a solid form, 3) "solidification" or set-up (i.e. gelification) of the liquid waste with optional mechanical kneading, and 4) final disposal. The final solidified product can then be disposed of via known options available for solid wastes.

The present invention provides an effective real-time liquid waste material treatment process that is operated in a continuous, single-pass flow-through mode, as opposed to batch operation. Considering the variable nature of liquid waste material, the treatment process is highly adjustable to accommodate the specific characteristics of the liquid waste material being treated. The process is operated either manually, or automated by way of computer control. The treatment apparatus is sufficiently compact to allow mounting on a trailer. This allows the apparatus to be used on-site, close to the source, thus reducing the need for costly transport, as well as reducing the inherent hazards and regulatory approvals associated with waste transport.

Figure 1:
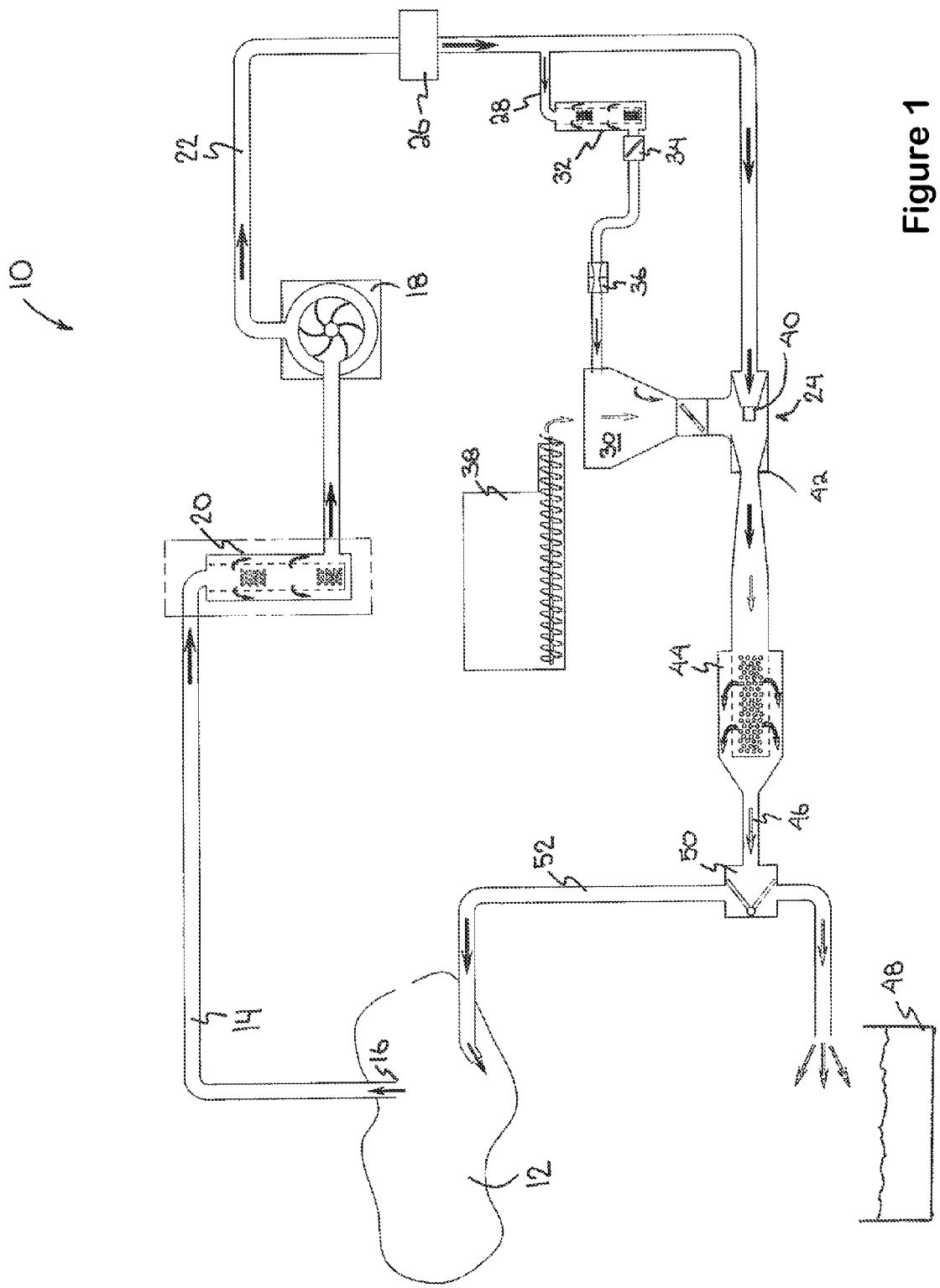
FIG. 1 is a schematic diagram of an apparatus for treating liquid waste material according to one embodiment.

Turning now to FIG. 1, an apparatus for treating liquid waste material is shown and generally identified by reference numeral 10. Liquid waste material is generally collected in a pit or tank 12, and may contain a variety of contaminants such as hydrocarbons originating from oil drilling operations. While this waste material is generally referred to as liquid, it contains a varying degree of solid matter including soil, rocks and other debris generated during drilling operations. In operation, the liquid waste is drawn up through inlet conduit 14 from the pit or tank 12 through a size regulated inlet 16 by the trash pump 18. The liquid waste is directed through coarse filter 20 which reduces the amount of debris capable of plugging constricted areas of the overall apparatus. The coarse filter 20 also serves to homogenize the fluid stream so as to improve the overall treatment process.

After exiting trash pump 18, the liquid waste travels via a conduit 22 to a mixing zone 24. In line with conduit 22 is a flow meter 26 that provides the operator with a measure of liquid waste flow through the system. As shown, a minor portion of the liquid waste is directed away from conduit 22, through conduit 28 to a generally conical swirl bowl 30. This diverted stream is used to facilitate the addition of dry treatment product in swirl bowl 30, as described below. The liquid waste passing through conduit 28 is directed through a second filter 32 so as to reduce the likelihood of blockage in constricted areas of the swirl bowl. To control liquid flow through conduit 28, an on/off valve 34 and metering valve/orifice 36 are also provided.

The dry treatment product used to treat (i.e. chemically solidify or gel) the liquid waste is metered into the swirl bowl 30 with a metering bulk hopper 38. As the dry treatment product falls into the swirl chamber 30, it is combined with the fluid delivered via conduit 28, and flows down into the mixing zone 24. To facilitate this delivery, the fluid delivered via conduit 28 is introduced at the top of the swirl chamber 30 at an angle that causes the fluid stream to adopt a swirling motion as it follows the cone shape towards the mixing zone 24. In this way, even small amounts of dry treatment product are efficiently delivered to the mixing zone 24. In mixing zone 24, the product from swirl bowl 30 and the liquid waste delivered via conduit 22 are combined, this process being facilitated by placement of nozzle 40 and venturi tube 42, and the subsequent shear assembly 44. The nozzle 40, venturi tube 42 and shear assembly 44 facilitate mixing by providing a high shear mix to the combined product. The effect of the high shear mixing is to increase the surface area contact between the dry treatment product and the liquid waste, so as to reduce agglomeration and increase dispersion, thereby increasing efficient usage of the dry treatment product. With regard to the nozzle 40 and venturi tube 42, in a preferred arrangement, the dimensions for these structures is generally in the region of $^{11}/_{16}$ inch I.D. and 1 inch I.D., respectively. Downstream of mixing zone 24, the treated liquid waste is directed through discharge conduit 46 into a suitable retention basin 48, suitable for subjecting the treated liquid waste to a residence time necessary for solidification of the waste material. A suitable retention basin 48 can take on any number of forms, such as a pit or container of a dump truck.

The apparatus described above and shown in FIG. 1 is switchable between a discharge mode and a recirculation mode in which the liquid waste is directed back into the pit or tank. Recirculation of the liquid waste is useful during start-up (i.e. pump priming), calibration of the system, cleanup or maintenance operations, as well as shut-down. Recirculation is generally performed with untreated liquid waste so as to avoid the addition of dry treatment product to the pit or tank 12. In many instances, the apparatus is operated in recirculation mode prior to dry treatment product delivery so as to homogenize the liquid contents in the pit or tank 12, thus ensuring a more consistent treatment regimen. This pre-run recirculation also permits the calibration of the apparatus so as to enable either the operator (in manual mode) or the central processor (in automatic mode; described below) to determine the correct amount of dry treatment product necessary to treat the particular liquid waste. This has the advantage of reducing the amount of wastage of the dry treatment product, thereby reducing overall cost. Furthermore, since the apparatus is operated as a single-pass, flow-through apparatus, this pre-run calibration step reduces the likelihood that the discharged treated product is insufficiently treated which could lead to inadequate solidification and possibly leakage of contaminants. To enable operation in recirculation mode, conduit 46 is fitted with a 2-way valve 50 that is capable of diverting the liquid waste back to the pit or tank via recirculation conduit 52.

The apparatus described above is suitable for use in manual mode. By controlling pump 18, valves 34, 36 and 50, as well as metering hopper 38 and swirl bowl valve 39, an operator is able to tailor the treatment regimen for a particular application. As required, the apparatus can be fitted with flow meters (i.e. flow meter 26) to obtain information about a particular run, enabling the operator to make adjustments as necessary.

Figure 2:
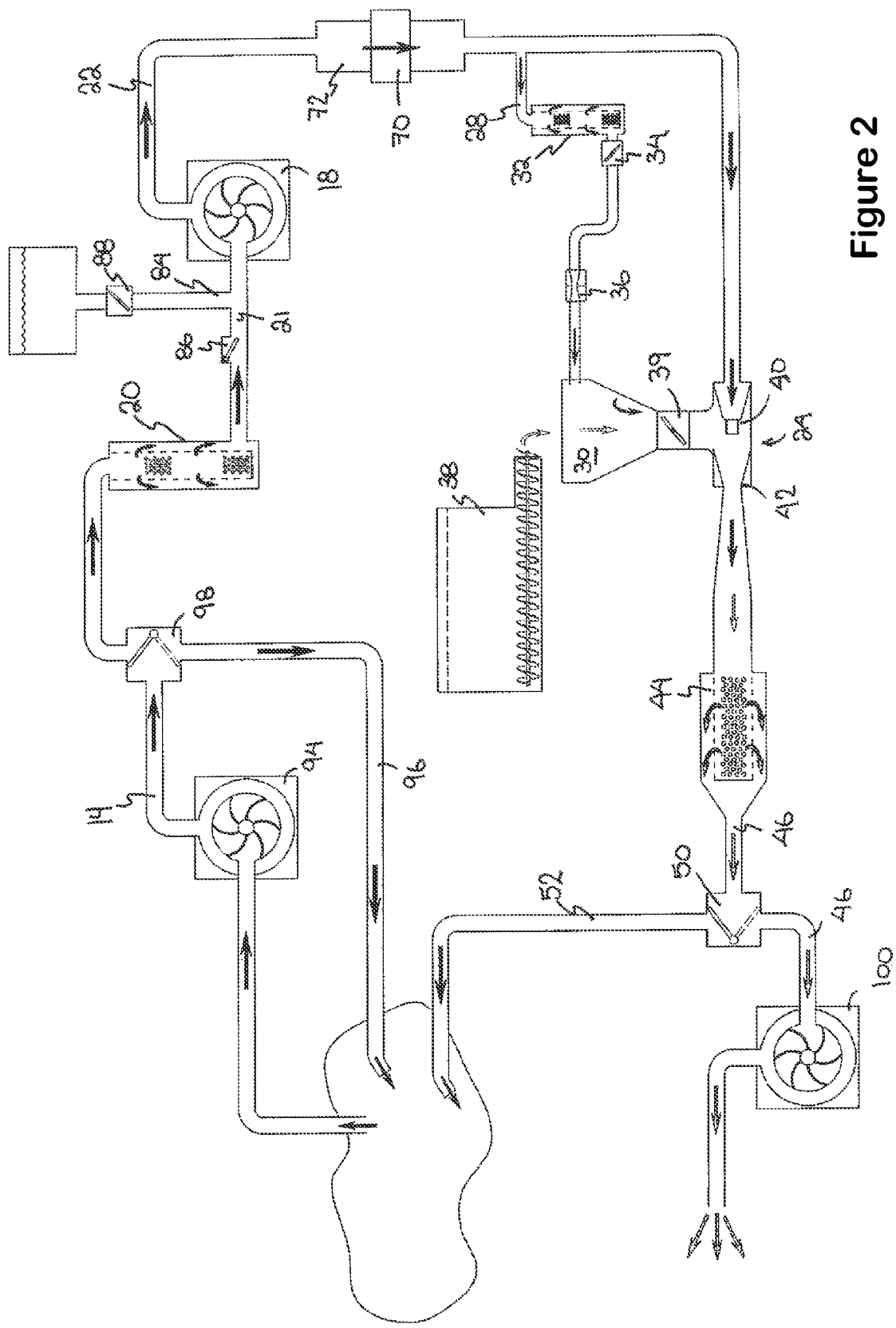
FIG. 2 is a schematic diagram of an apparatus for treating liquid waste material according to an alternate embodiment, in which the apparatus is automated.

In an alternate embodiment, the apparatus is set for automated operation, as shown in FIG. 2. To automate the apparatus, a number of monitoring/control devices are added into the apparatus, as well as a central processor (not shown). The automation of the treatment regimen is dependent in part upon the characteristics of the liquid waste. To obtain these characteristics in "real-time", the apparatus is provided with a fluid flow meter 70 and a metering scale 72 in conduit 22. Metering scale 72 serves to calculate the weight of the "mud", that is the weight of the solids content in the liquid waste stream on a mass per unit volume basis (i.e. lbs/gal). In operation, the optimal flow of liquid waste through the apparatus is approximately 80 gallons per minute. As such, based on this flow rate, and an estimated weight of "mud" calculated by way of metering scale 72, the metering bulk hopper 38 is able to deliver the appropriate amount of dry treatment product. In general, for solidifying a liquid waste, the amount of product to be added to the liquid waste ranges from 1 to 10% (wt/wt) based on a weight percentage, but is preferably in the range of 2 to 6% (wt/wt), and more preferably approximately 3% (wt/wt). The data being received from the fluid flow meter 70 and the metering scale 72 is fed into a central processor (not shown) which optimizes dry treatment product delivery by way of metering bulk hopper 38. This "real-time" monitoring of the liquid waste provides a greater degree of accuracy with respect to dispensing the dry treatment product. In addition, the central processor is able to control flow rates by controlling pump 18, as well as the various control valves in the apparatus (i.e. valves 34, 36, 50). Automation of the process also allows for auto shut-off in the event that the treatment powder bridges or runs out, thus reducing the likelihood that untreated liquid waste continues through the apparatus.

In the embodiment shown in FIG. 2, also provided is a fresh water inlet 84 in conduit 21. The fresh water inlet 84 provides a way to flush the apparatus during a cleaning session. Fresh water inlet 84 also facilitates dilution of the liquid waste should dilution be necessary for a particular application. To reduce the likelihood of backflow of fresh water towards the pit, conduit 21 is fitted with a check valve 86. Control of the inflow of fresh water is provided by way of valve 88 which may be operated manually, or through control from a central processor. The supply of fresh water can be provided by either a suitable tank or basin, or by way of a direct supply line, depending on the availability of a fresh water source.

For certain liquid wastes, it will be appreciated that a pre-filtration step will be necessary to remove large debris. Shown in FIG. 3 is an optional prefilter 54 for fitting into inlet conduit 14. The prefilter 54 includes a holding container 56 having a lower funnel region 58 and a bottom valve assembly 64. As the liquid waste gets pumped into the prefilter 54, the larger debris (i.e. rocks) that cannot pass through holes 62 fall to the bottom of the holding container 56. The liquid in the prefilter, together with any of the smaller debris being carried by the liquid waste stream passes through holes 62 and continues onwards to pump 18 and the rest of the apparatus. To remove the larger debris in the holding container 56, the bottom valve assembly 64 is opened, allowing the collected debris to fall from the container for disposal. While a variety of valve assemblies (i.e. knife valves) are suited for the above noted application, it will be appreciated that the prefilter 54 can include a hinged or removable cap to allow removal of collected debris from holding container 56. To facilitate insertion of the prefilter 54 into inlet conduit 14, the prefilter 54 and inlet conduit 14 can be provided with quick release connectors 66. In addition, while the above description has been limited to a single prefilter assembled in-line with inlet conduit 14, it is also possible to assemble multiple prefilters in parallel as shown in FIG. 3a.

In automated applications using multiple prefilters, the central processor is operable to control flow through the prefilters arranged in parallel by controlling valves 76, 78, 80 and 82. For example, during operation, it may be advantageous to open valves 76 and 78, while keeping valves 80 and 82 closed, thereby directing the waste stream through prefilter 54a. When the central processor detects that prefilter 54a is full (i.e. by weight, back pressure, etc.), valves 80 and 82 are opened while valves 76 and 78 are closed, thereby directing the waste stream through prefilter 54b. During this time, prefilter 54a can be cleaned out by way of bottom valve assembly 64, so that continual operation by switching back and forth between the two prefilters is possible. In automated mode, bottom valve assembly 64 can be opened and closed by way of a switch that is controlled by the central processor. It is clear from the above discussion that the ability to monitor the process and adapt for changes allows continual running of the apparatus and process, without need to stop every time the liquid waste changes in viscosity or consistency.

It will be appreciated that the coarse filter 20 and shear assembly 44 are subject to accumulation of larger debris. In a preferred arrangement, these filters have holes that are about ¼ inch I.D. As such, these devices may be mounted using quick-couplers for cleaning purposes; the filter housings may include at least one access opening to permit manual flushing. Similar to the pre-filters described above, it will also be appreciated that fixtures such as these that are subject to accumulation of larger debris may be implemented in multiples positioned in parallel. This way, in the event of a blockage, an alternate unit is available for use. Switching between the multiple units placed in parallel can be either manual, or automated in a similar manner as described above for the pre-filter assemblies.

It will be appreciated that additional trash pumps can be incorporated into the apparatus 10. In instances where the distance from the pit/tank to the unit is considerable, an additional pump 94 can be incorporated into inlet conduit 14, as shown in the embodiment of FIG. 2. In such cases, the system is includes a return loop 96 facilitated by 2-way valve 98. The system can also include an additional trash pump 100 on the discharge conduit 46 in the event that the retention basin or disposal location is of considerable distance from the treatment unit. It will also be appreciated that alternate pumps/pump arrangements can be implemented as would be determinable by one skilled in the art. For example, the pumps can be engine driven, hydraulically driven, submersible, centrifugal or above ground.

Figure 4:
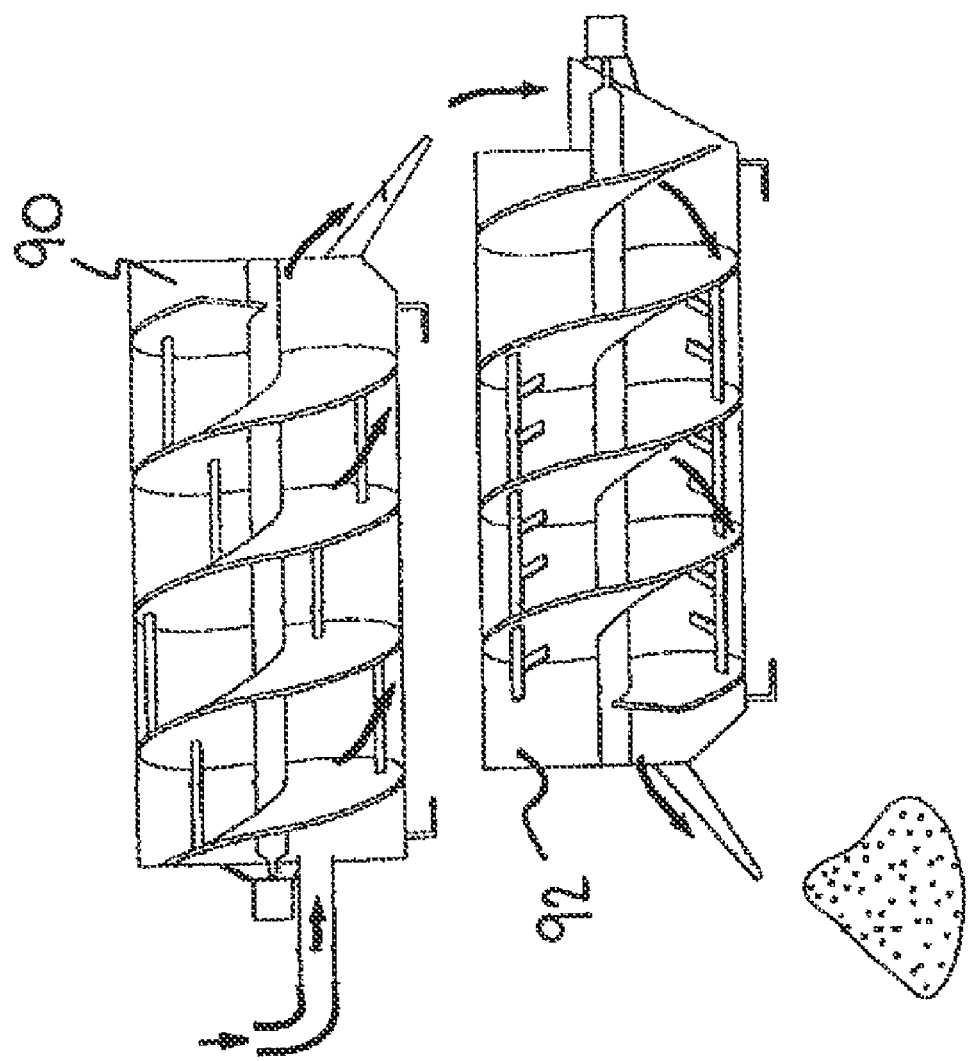
FIG. 4 is a schematic diagram of a mechanical mixing chamber suitable for use with the apparatus shown in either of FIG. 1 or 2.

As presented above, following mixing of the dry treatment product into the liquid waste, the mixture "solidifies", gels or sets in the receiving retention basin or disposal location. For applications where mechanical agitation is required during the residence time, a mechanical mixing chamber can be incorporated into the system. A suitable mechanical mixing chamber can include a liquid mixing auger to handle more fluid waste, a kneading auger to handle more solid waste, or a combination of both. An example of a mechanical agitation system that can be added onto the discharge end of the apparatus is shown in FIG. 4. In this combined system, the treated liquid waste moves through the first liquid auger 90, the treated liquid waste gradually becoming more solid, passing in turn to the second kneading auger 92, subsequent to which the end product is discharged for disposal.

The apparatus described above can be assembled on a transportable platform (i.e. a truck bed) so as to allow portability and facilitate easy transport on-site, where needed. The present invention offers versatility in that it can be automated to adjust to changing conditions, for example changes in consistency and viscosity of the liquid waste. As such, the technology can be applied to a wide range of liquid wastes, for example wastes originating from HDD operations, oil drilling operations and other industrial processes. The process may also find application in treating industrial and biological wastes.

The dry treatment product suitable for use with the above described apparatus and process generally comprises at least one bentonite clay (i.e. sodium bentonite or calcium bentonite) and at least one dry/powdered liquid-sorbing polymer (i.e. anionic or cationic water absorbent polymers, non-aqueous absorbing/adsorbing polymers, etc.). In general, the dry/powdered liquid-sorbing polymer serves to "dry" the product, while the bentonite clay component effectively encapsulates any chemical entities in the waste stream, thereby reducing the likelihood of leaching of liquid waste from the end product. The use of the above described apparatus enables highly efficient single-pass mixing of the dry treatment product into the liquid waste stream. The apparatus can thus be operated in flow-through mode so as to simplify operations and reduce overall cost. As indicated in the background above, prior art technologies have used less effective treatment products with standard mixing regimes, resulting in a far less efficient incorporation of dry treatment product. The above described apparatus is able to take full advantage of the physicochemical nature of the dry treatment product by subjecting the combined liquid waste/dry treatment product to shear forces that ensure increased surface area contact between them. The apparatus is operable to reduce agglomeration and increase dispersion of the dry treatment product upon contact with the liquid waste, thereby reducing the formation of clumps and therein unused dry treatment product. For dry treatment product comprised of bentonite clay and liquid-sorbing polymer, the ratio of bentonite clay to liquid-sorbing polymer will vary depending on the application. In general, with wastes containing a higher proportion of hydrocarbons, a higher bentonite clay content is desirable. For example, with HDD operations where the hydrocarbon content is quite low, the blend is generally 25% bentonite clay to 75% polymer. For oil field or other industrial waste applications, the ratio may be upwards of 75% bentonite clay to 25% polymer. It may also in certain applications be particularly advantageous to use a variety of different bentonite clays to obtain the desired sorption and encapsulation qualities.

A treatment regimen using the above apparatus and dry treatment product results in a "solidified" treated product that is reduced in volume compared to the initial volume being treated. For a given volume being treated, once the dry treatment product is added (i.e. 4% wt/wt), the resulting solidified product after 48-72 hours demonstrates a reduction in overall volume of up to 20%. This reduction appears to be related to the evaporation of liquid from the "solidified" waste, resulting in a decreased overall volume. Compared to conventional bulk-up technologies that exhibit anywhere from 40-300% increase in volume, the reduction in volume observed provides a significant savings with respect to solid waste disposal. Furthermore, the encapsulation of the contaminants (i.e. salts) in the "solidified" waste appears to be very effective as the extractability of these contaminants is reduced. While not completely understood, it is believed that the high surface area contact between the dry treatment powder and the liquid waste provided by the aforementioned apparatus ensures a high degree of encapsulation of the contaminants, thereby reducing the extractability of these compounds.

The ability of the bentonite clay/polymer blend to "dry" or "solidify" the liquid waste with little or no leachate offers the possibility of disposing the waste material on site, as permitted by environmental regulations. This would dramatically decrease the overall cost of disposal, as transport from the site would not be necessary.

It will be appreciated that although the aforementioned apparatus has been described with respect to bentonite clays and liquid-sorbing polymers as the solidifying/drying agent, the apparatus can be effectively used with a wide range of other dry treatment products suited for solidification, gelification or drying of liquid wastes. The high surface contact between the dry treatment product and the liquid waste achieved by the present apparatus makes the unit especially suited for situations where a highly efficient incorporation of dry product is required in a liquid stream.

Having regard to the effective mixing offered by the aforementioned apparatus, it will also be appreciated that the apparatus may be used as a mixer for incorporating other dry treatment products (i.e. non-solidifying treatment products) into liquid wastes. In this capacity, dry treatment products may be effectively added with highly effective homogenization at amounts as low as 0.01% (wt/wt).

The aforementioned apparatus permits a single pass highly efficient dispersion of a dry reagent in a liquid waste stream using multiple points of shear, wherein used with combinations of dry reagents and waste stream that exhibit rapid or short term gel, set, or solidification, results in a novel waste liquid solidification process of particular value where combinations result in a reduction in overall waste volume.

It will be appreciated that, although embodiments of the invention have been described and illustrated in detail, various modifications and changes may be made. While preferred embodiments are described above, some of the features described above can be replaced or even omitted. As mentioned, additional pumps may be used depending on the distances over which the liquid waste is required to pass. While 80 gal/min is considered an optimal flow for the apparatus, the operational range is 70 to 120 gal/min, with higher or lower flow rates also possible with alternate pumps readily available on the market. A number of filters are shown incorporated into the system. Depending on the application, it may be possible to remove, for example, the coarse filter when the liquid waste is sufficiently fluid and low in large debris. In some applications, it may not be necessary to add fluid to the swirl bowl. For certain liquid waste, it may be necessary to supplement the liquid waste with additives (i.e. soap additives for separation/break-up of oils in the liquid waste). In such instances, the course filter serves to mix the additives into the waste stream prior to addition of the dry treatment product. Still further alternatives and modifications may occur to those skilled in the art. All such alternatives and modifications are believed to be within the scope of the invention.

What is claimed is:

1. A process for treating and disposing a liquid waste wherein said liquid waste is solidified prior to waste disposal, said process comprising:
    calibrating characteristics of the liquid waste using a recirculation mode to determine an amount of dry treatment product necessary to treat the liquid waste,
    adding to said liquid waste a dry treatment product generally comprising approximately 25% to 75% bentonite clay and respectively 75% to 25% of a liquid-sorbing polymer at a rate determined by said characteristics,
    subjecting said liquid waste to a single pass high shear mix so as to incorporate said treatment product into said liquid waste with increased dispersion and reduced agglomeration;
    subjecting the treated liquid waste to a retention time suitable for solidification;
    storing said treated liquid waste to allow for evaporation of water, thereby resulting in a decrease in overall volume relative to a predetermined initial volume of liquid waste to be treated; and
    disposing of the solidified liquid waste.

2. The process of claim 1, wherein said liquid waste is prefiltered prior to addition of dry treatment product.

3. The process of claim 1, wherein said liquid-sorbing polymer is a water-sorbent polymer.

* * * * *